(12) United States Patent
Brostmeyer

(10) Patent No.: US 8,347,634 B1
(45) Date of Patent: Jan. 8, 2013

(54) COMBINED CYCLE POWER PLANT

(75) Inventor: Joseph D. Brostmeyer, Jupiter, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 591 days.

(21) Appl. No.: 12/708,371

(22) Filed: Feb. 18, 2010

Related U.S. Application Data

(60) Provisional application No. 61/153,918, filed on Feb. 19, 2009.

(51) Int. Cl.
*F02C 1/00* (2006.01)

(52) U.S. Cl. .......................... 60/772; 60/39.5; 60/39.182

(58) Field of Classification Search .................. 60/39.12, 60/39.182, 39.47, 39.5, 772; 122/7 R, 7 B
See application file for complete search history.

(56) References Cited

U.S. PATENT DOCUMENTS

| | | | | |
|---|---|---|---|---|
| 4,362,013 A | * | 12/1982 | Kuribayashi | 60/772 |
| 4,729,217 A | * | 3/1988 | Kehlhofer | 60/781 |
| 6,141,956 A | * | 11/2000 | Iijima et al. | 60/39.182 |
| 6,351,935 B1 | * | 3/2002 | Bronicki et al. | 60/39.182 |
| 6,572,674 B1 | * | 6/2003 | Avart et al. | 75/433 |
| 2005/0268594 A1 | * | 12/2005 | Kurihara et al. | 60/39.182 |

* cited by examiner

*Primary Examiner* — Phutthiwat Wongwian
(74) *Attorney, Agent, or Firm* — John Ryznic

(57) ABSTRACT

A combined cycle power plant with a gas turbine engine integrated with a dirty fuel combustor in the turbine exhaust and the hot gas stream from the dirty combustor is mixed together and then passed through a heat recovery steam generator to produce steam, the steam being passed through a steam turbine to drive a second electric generator. Some of the turbine exhaust is passed directly into the HRSG while the remaining turbine exhaust is passed into the combustor and burned with the dirty fuel.

8 Claims, 1 Drawing Sheet

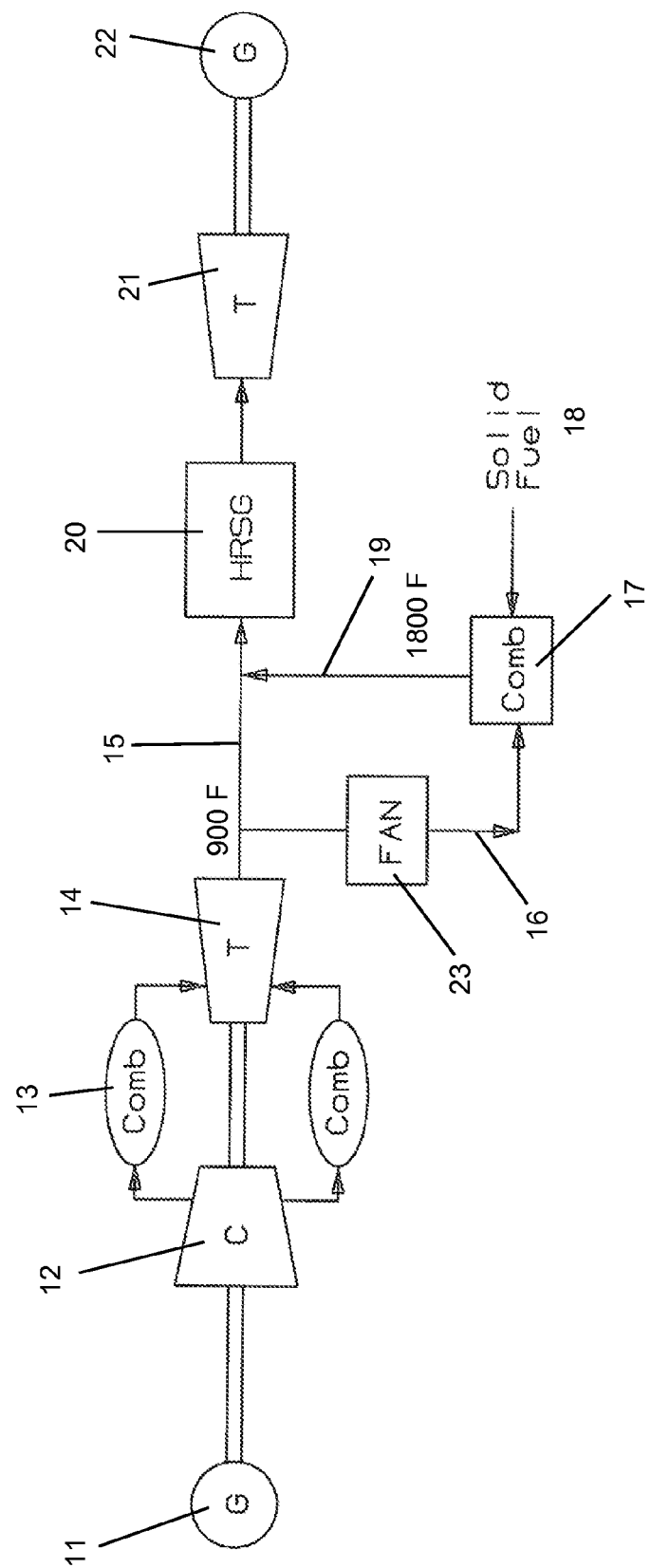

COMBINED CYCLE POWER PLANT

CROSS-REFERENCE TO RELATED APPLICATIONS

This application claims the benefit to U.S. Provisional Patent Application Ser. No. 61/153,918 filed on Feb. 19, 2009 and entitled COMBINED CYCLE POWER PLANT.

FEDERAL RESEARCH STATEMENT

None.

BACKGROUND OF THE INVENTION

1. Field of the Invention

The present invention relates generally to a combined cycle power plant, and more specifically to a power plant with a dirty fuel combustor and a gas turbine engine.

2. Description of the Related Art including information disclosed under 37 CFR 1.97 and 1.98

Combined cycle power plants are well known in which a gas turbine engine drives an electric generator to produce electrical energy. The turbine exhaust is typically at around 400 degrees F., and in a non-combined cycle engine this hot gas exhaust is passed directly to the atmosphere through the stack. In a combined cycle engine, the hot exhaust gas is passed through a heat exchanger to pre-heat inlet air that is passed into the compressor, and thus improves the overall efficiency of the engine. Gas turbine engines are being integrated into regular power plant that uses another fuel, such as coal or natural gas, to produce steam to drive a steam turbine. One major problem with using a gas turbine engine with another power generating fuel is that the fuel, such as coal, produces contaminants that will block film cooling holes in the turbine vanes and blades and cause thermal damage. Another problem is that the combustion of the dirty fuel will also cause corrosion damage to the turbine parts.

BRIEF SUMMARY OF THE INVENTION

A combined cycle power plant with a gas turbine engine integrated with a dirty fuel combustor in the turbine exhaust and the hot gas stream from the dirty combustor is mixed together and then passed through a heat recovery steam generator to produce steam, the steam being passed through a steam turbine to drive a second electric generator. Some of the turbine exhaust is passed directly into the HRSG while the remaining turbine exhaust is passed into the combustor and burned with the dirty fuel.

BRIEF DESCRIPTION OF THE SEVERAL VIEWS OF THE DRAWINGS

FIG. 1 shows a cross section view of the combined cycle power plant of the present invention.

DETAILED DESCRIPTION OF THE INVENTION

A combined cycle power plant is shown in FIG. 1 and includes an electric generator 11 connected to a gas turbine engine that includes a compressor 12, a combustor 13 and a turbine 14 that drives the electric generator 11 and produces electrical power. The turbine 14 exhaust is connected by a passage 15 to a heat recovery steam generator (HRSG) 20 that converts water into steam using the heat from the turbine exhaust 15. The steam generated is supplied to a steam turbine 21 that is connected to a second generator 22 to produce electrical power.

The feature of the present invention is the use of a second combustor 17 that can burn a dirty fuel which is considered a fuel that is not good for burning within the gas turbine engine because of particulates such as coal or other contaminants. Some of the turbine 14 exhaust is diverted through bypass passage 16 to be used to burn with the dirty fuel 18 within the second combustor 17 and produce a hot gas flow 19. A fan 23 is used to increase the pressure of the hot gas flow from the combustor 17 so that the turbine exhaust from line 15 will not flow toward the combustor 17 but into the HRSG 20. The fan 23 can be located in other sections of the flow from the turbine 14 outlet to the HRSG 20 inlet. The hot gas flow 19 is then mixed with the remaining turbine 14 exhaust from passage 15 and delivered into the HRSG to produce the steam for the steam turbine 21. In this particular embodiment, the gas turbine engine can be a large industrial gas turbine (IGT) engine in the order of 200 MWatts while the second combustor can be in the order of 20 MWatts. The second combustor 17 produces a hot gas flow that is mixed with the cooler turbine exhaust in order to prevent the combustion gases from the second combustor 17 from entering into the gas turbine engine. The second combustor 17 allows for a second fuel source to be used in the combined cycle power plant and also increases the efficiency of the gas turbine engine and steam turbine combination.

I claim the following:

1. A combined cycle power plant for producing electrical power comprising:
   A gas turbine engine with a compressor, a combustor and a turbine, the gas turbine engine burning a first fuel;
   a first electric generator rotatably connected to the gas turbine engine;
   a heat recovery steam generator with an inlet connected to an outlet of the turbine;
   a steam turbine connected to receive steam from the heat recovery steam generator;
   a second electric generator rotatably connected to the steam turbine;
   a second combustor for burning a second fuel to produce a hot gas stream;
   a bypass passage to connect the turbine outlet to an inlet of the second combustor;
   a hot gas stream passage to connect an outlet of the second combustor to the inlet of the heat recovery steam generator; and,
   some of a turbine exhaust is passed directly into the heat recovery steam generator while a remaining turbine exhaust is passed into the second combustor to produce the hot gas stream that is then mixed with the turbine exhaust to produce steam for the steam turbine.

2. The combined cycle power plant of claim 1, and further comprising:
   a fan located between the turbine outlet and the second combustor inlet to increase a pressure of the hot gas stream such that the hot gas stream will not flow back into the second combustor.

3. The combined cycle power plant of claim 1, and further comprising:
   the second fuel burned in the second combustor is a dirty fuel that would contaminate the turbine.

4. The combined cycle power plant of claim 3, and further comprising:
   the second fuel is a solid fuel.

5. A process for producing electrical power comprising the steps of:

burning a first fuel in a gas turbine engine to drive a turbine;

driving an first electrical generator with the gas turbine engine to produce electrical power;

passing some of a turbine exhaust into a heat recovery steam generator to produce steam;

passing a remaining turbine exhaust into a second combustor;

burning a second fuel within the second combustor to produce a hot gas stream;

mixing the hot gas stream with the turbine exhaust that is passed directly into the heat recovery steam generator to produce steam;

passing the steam into a steam turbine; and, driving a second electrical generator with the steam turbine to produce additional electrical power.

6. The process for producing electrical power of claim 5, and further comprising the step of:

increasing a pressure of the turbine exhaust prior to the turbine exhaust entering the second combustor so that the hot gas stream will flow into the heat recovery steam generator.

7. The process for producing electrical power of claim 5, and further comprising the step of:

burning a dirty fuel in the second combustor to produce the hot gas stream.

8. The process for producing electrical power of claim 7, and further comprising the step of:

the dirty fuel is a solid fuel.

\* \* \* \* \*